United States Patent
Appia et al.

(10) Patent No.: US 9,256,943 B2
(45) Date of Patent: Feb. 9, 2016

(54) PROJECTOR-CAMERA MISALIGNMENT CORRECTION FOR STRUCTURED LIGHT SYSTEMS

(71) Applicant: Texas Instruments Incorporated, Dallas, TX (US)

(72) Inventors: Vikram VijayanBabu Appia, Dallas, TX (US); Ibrahim Ethem Pekkucuksen, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 128 days.

(21) Appl. No.: 14/228,236

(22) Filed: Mar. 27, 2014

(65) Prior Publication Data

US 2014/0294290 A1    Oct. 2, 2014

Related U.S. Application Data

(60) Provisional application No. 61/806,117, filed on Mar. 28, 2013.

(51) Int. Cl.
| | |
|---|---|
| *G06K 9/00* | (2006.01) |
| *G06K 9/32* | (2006.01) |
| *G06T 7/00* | (2006.01) |

(52) U.S. Cl.
CPC .................................. *G06T 7/0018* (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 8,224,064 B1 * | 7/2012 | Hassebrook | ....... G01B 11/2513 345/585 |
| 8,662,676 B1 * | 3/2014 | Chang | .................. H04N 17/002 345/158 |
| 8,836,766 B1 * | 9/2014 | Hebert | ............... H04N 13/0275 348/135 |
| 2008/0205748 A1 * | 8/2008 | Lee | ........................ G01B 11/25 382/154 |
| 2012/0128236 A1 | 5/2012 | Pekkucuksen et al. | |

OTHER PUBLICATIONS

Chris Harris and Mike Stephens, "A Combined Corner and Edge Detector", Proceedings of the 4th Alvey Vision Conference, Manchester, UK, Aug. 31-Sep. 2, 1988, pp. 147-151.
Michael Calonder et al, "BRIEF: Binary Robust Independent Elementary Features", ECCV'10 Proceedings of the 11th European Conference on Computer Vision: Part IV, Sep. 5, 2010, Heraklion, Crete, Greece, pp. 778-792.

(Continued)

*Primary Examiner* — Daniel Mariam
(74) *Attorney, Agent, or Firm* — Gregory J. Albin; Frank D. Cimino

(57) ABSTRACT

A method of misalignment correction in a structured light device is provided that includes extracting features from a first captured image of a scene, wherein the first captured image is captured by an imaging sensor component of the structured light device, and wherein the first captured image includes a pattern projected into the scene by a projector component of the structured light device, matching the features of the first captured image to predetermined features of a pattern image corresponding to the projected pattern to generate a dataset of matching features, determining values of alignment correction parameters of an image alignment transformation model using the dataset of matching features, and applying the image alignment transformation model to a second captured image using the determined alignment correction parameter values.

20 Claims, 2 Drawing Sheets

(56) References Cited

OTHER PUBLICATIONS

Richard Szeliski, "Image Alignment and Stitching: A Tutorial", Foundations and Trends in Computer Graphics and Vision, vol. 2, No. 1, Dec. 2006, pp. 1-104.

David G. Lowe, "Distinctive Image Features from Scale-Invariant Keypoints", International Journal of Computer Vision 2004, vol. 60, No. 2, Nov. 2004, pp. 91-110.

Joaquim Salvi, et al, "Pattern Codification Strategies in Structured Light Systems", Pattern Recognition, vol. 37, No. 4, Apr. 2004, pp. 827-849.

* cited by examiner

PROJECTOR-CAMERA MISALIGNMENT CORRECTION FOR STRUCTURED LIGHT SYSTEMS

CROSS-REFERENCE TO RELATED APPLICATIONS

This application claims benefit of U.S. Provisional Patent Application Ser. No. 61/806,117, filed Mar. 28, 2013, which is incorporated by reference herein in its entirety.

BACKGROUND OF THE INVENTION

1. Field of the Invention

Embodiments of the present invention generally relate to correction of projector-camera misalignment in structured light systems.

2. Description of the Related Art

In structured light imaging systems, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the captured pattern in comparison to the projected pattern. In such imaging systems, the relative position of the camera with respect to the projector is typically fixed and the camera-projector pair is initially calibrated, e.g., by the maker of the system or by a user following calibration instructions.

After physical calibration, a further step involving projecting a checker board pattern on a plane surface at different depths may be required. Note that this calibration may require that the projector has the capability to project more than one pattern. Calibration is performed by finding correspondences between locations of corners of the checkerboard pattern in captured and projected images. Such calibration may require manual intervention in which the plane surface is moved by the user in front of the camera-projector pair. This calibration is generally performed once as the assumption is that there will be no change in the relative position of the camera-projector pair.

Such calibration is generally sufficient as long as the camera-projector pair remains stationary. However, in practical applications, a structured light system may not be stationary. For example, a structured light system may be mounted on an unstable platform or used in a handheld device. In such applications, the relative position of the camera and projector can be altered unintentionally over time or due to manufacturing imperfections and environmental factors, thus necessitating re-calibration.

SUMMARY

Embodiments of the present invention relate to methods, apparatus, and computer readable media for correction of projector-camera misalignment in structured light systems. In one aspect, a method of misalignment correction in a structured light device is provided that includes extracting features from a first captured image of a scene, wherein the first captured image is captured by an imaging sensor component of the structured light device, and wherein the first captured image includes a pattern projected into the scene by a projector component of the structured light device, matching the features of the first captured image to predetermined features of a pattern image corresponding to the projected pattern to generate a dataset of matching features, determining values of alignment correction parameters of an image alignment transformation model using the dataset of matching features, and applying the image alignment transformation model to a second captured image using the determined alignment correction parameter values.

In one aspect, structured light device is provided that includes an imaging sensor component configured to capture images of a scene, a projector component configured to project a pattern into the scene, a memory configured to store predetermined features of a pattern image corresponding to the pattern, means for extracting features from a first image of the scene captured by the imaging sensor component, wherein the first image includes the pattern projected into the scene by the projector component, means for matching the features of the first image to the predetermined features to generate a dataset of matching features, means for determining values of alignment correction parameters of an image alignment transformation model using the dataset of matching features, and means for applying the image alignment transformation model with the determined alignment correction parameter values to a second image of the scene captured by the imaging sensor component.

In one aspect, a non-transitory computer-readable medium storing instructions that, when executed by at least one processor in a structured light device, cause a method of misalignment correction to be performed. The method includes extracting features from a first captured image of a scene, wherein the first captured image is captured by an imaging sensor component of the structured light device, and wherein the first captured image includes a pattern projected into the scene by a projector component of the structured light device, matching the features of the first captured image to predetermined features of a pattern image corresponding to the projected pattern to generate a dataset of matching features, determining values of alignment correction parameters of an image alignment transformation model using the dataset of matching features, and applying the image alignment transformation model to a second captured image using the determined alignment correction parameter values.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
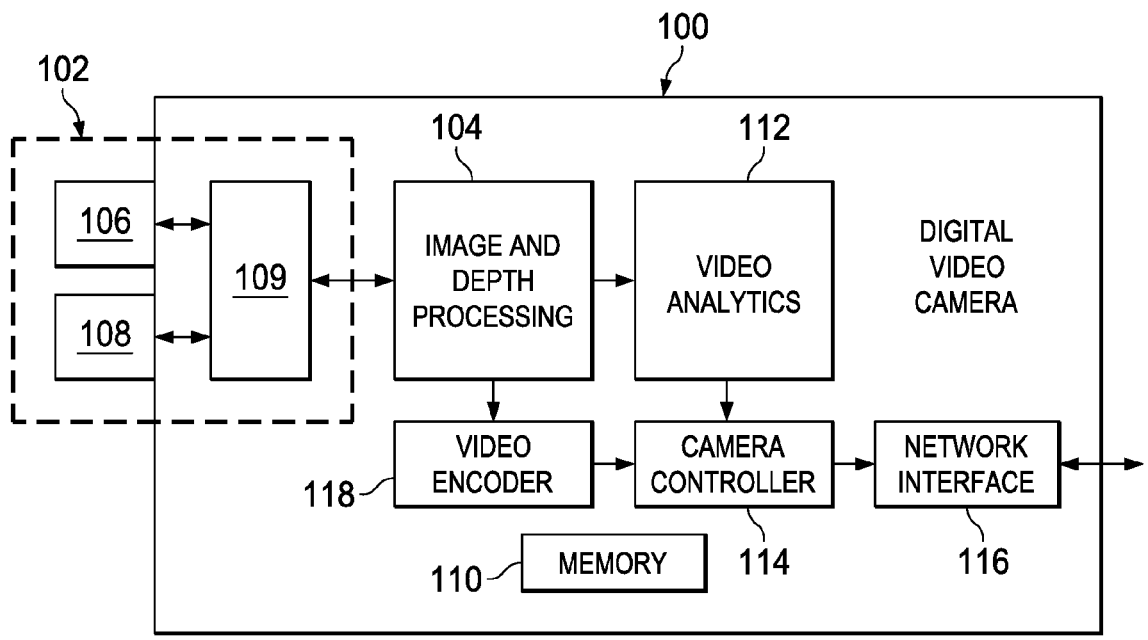
FIG. 1 is a block diagram of an example digital structured light device.

Specific embodiments of the invention will now be described in detail with reference to the accompanying figures. Like elements in the various figures are denoted by like reference numerals for consistency.

As previously mentioned, in some applications, the camera-projector pair in a structured light imaging system may become misaligned during use, thus necessitating re-calibration. The misalignments may include, for example, translation, rotation, scaling, and/or horizontal/vertical skew. It may not be practical to perform the prior art calibration techniques previously described. Moreover, some calibration techniques are not suited to systems in which the projector can project just one fixed projection pattern.

Embodiments of the invention provide for automatic calibration of a camera-projector pair in a structured light imaging system as the imaging system is used. Unlike prior art techniques, the provided automatic calibration does not require a change in the projected pattern or a flat surface in front of the camera-projector pair.

FIG. 1 is a block diagram of an example digital structured light device 100. The digital structured light device 100 includes a structured light imaging system 102, an image and depth processing component 104, a video encoder component 118, a memory component 110, a video analytics component 112, a camera controller 114, and a network interface 116. The components of the camera 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 110 and executed by one or more processors.

The structured light imaging system 102 includes an imaging sensor component 106, a projector component 108, and a controller component 109 for capturing images of a scene. The imaging sensor component 106 is an imaging sensor system arranged to capture image signals of a scene and the projector component 108 is a projection system arranged to project a pattern of light into the scene. The imaging sensor component 106 includes a lens assembly, a lens actuator, an aperture, and an imaging sensor. The projector component 108 includes a projection lens assembly, a lens actuator, an aperture, a light source, and projection circuitry. The structured light imaging system 102 also includes circuitry for controlling various aspects of the operation of the system, such as, for example, aperture opening amount, exposure time, synchronization of the imaging sensor component 106 and the projector component 108, etc. The controller component 109 includes functionality to convey control information from the camera controller 114 to the imaging sensor component 106, the projector component 108, to convert analog image signals from the imaging sensor component 106 to digital image signals, and to provide the digital image signals to the image and depth processing component 104.

In some embodiments, the imaging sensor component 106 and the projection component 108 may be arranged vertically such that one component is on top of the other, i.e., the two components have a vertical separation baseline. In some embodiments, the imaging sensor component 106 and the projection component 108 may be arranged horizontally such that one component is next to the other, i.e., the two components have a horizontal separation baseline.

The image and depth processing component 104 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right images. In addition, the image and depth processing component 104 may perform an embodiment of the method for projector-camera misalignment correction of FIG. 2 to enhance the image data, i.e., to adjust the image data for any misalignment between the imaging component 106 and the projection system 108. The misalignment correction may be performed before or after the other image enhancement techniques.

With either a horizontal or vertical component baseline, the field of view (FOV) of the imaging sensor component 106 may be larger than that of the projector component 108. The projected pattern varies in the captured image along the direction (epipolar lines) of the imaging sensor-projector separation based on the depth of objects in a scene. Thus, a wider FOV is needed to capture the projected pattern irrespective of the depth of objects in the scene. Accordingly, the image and depth processing component 104 may perform rectification on each captured image to correct for the FOV variation in the direction perpendicular to the component baseline. Among other operations, the rectification processing may include discarding any portions of the captured image that are outside the boundaries of the projected pattern. The rectification parameters may be determined during offline calibration of the imaging sensor-projector pair and stored in the memory component 110 for use by the image and depth processing component 104. In some embodiments, the rectification parameters may be updated as needed during operation of the digital structured light device 100.

The image and depth processing component 104 then uses the enhanced image data to generate a depth image. Any suitable algorithm may be used to generate the depth image from the enhanced image data. The enhanced captured image is provided to the video encoder component 108 and depth image and enhanced captured image are provided to the video analytics component 112.

The video encoder component 108 encodes the image in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 110 may be on-chip memory, external memory, or a combination thereof. Any suitable memory design may be used. For example, the memory component 110 may include static random access memory (SRAM), dynamic random access memory (DRAM), synchronous DRAM (SDRAM), read-only memory (ROM), flash memory, a combination thereof, or the like. Various components in the digital structured light device 100 may store information in memory in the memory component 110 as a video stream is processed. For example, the video encoder component 108 may store reference data in a memory of the memory component 110 for use in encoding frames in the video stream. The memory component 110 may also store a pattern image and associated features for use by the image and depth processing component 104 in performing the method of FIG. 2. Pattern images and associated features are explained in more detail in reference to FIG. 2.

Further, the memory component 110 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 100. In some cases, the software instructions may also be sold in a computer program product, which includes the computer-readable medium and packaging materials for the computer-readable medium. In some cases, the software instructions may be distributed to the digital structured light device 100 via removable computer readable media (e.g., floppy disk, optical disk, flash memory, USB key), via a transmission path from computer readable media on another computer system (e.g., a server), etc.

The camera controller component 114 controls the overall functioning of the digital structured light device 100. For example, the camera controller component 114 may adjust the focus and/or exposure of the structured light imaging system 102 based on the focus quality and scene brightness, respectively, determined by the image and depth processing component 104. The camera controller component 114 also controls the transmission of the encoded video stream via the network interface component 116 and may control reception and response to camera control information received via the network interface component 116.

The network interface component 116 allows the digital structured light device 100 to communicate with other systems, e.g., a monitoring system, via a network such as, for example, a local area network (LAN), a wide area network (WAN) such as the Internet, a cellular network, any other similar type of network and/or any combination thereof. The network interface component 116 may use any suitable network protocol(s).

The network interface component 524 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The video analytics component 112 analyzes the content of images in the captured video stream to detect and determine temporal events not based on a single image. The analysis capabilities of the video analytics component 112 may vary in embodiments depending on such factors as the processing capability of the digital structured light device 100, the particular application for which the digital structured light device is being used, etc. For example, the analysis capabilities may range from video motion detection in which motion is detected with respect to a fixed background model to people counting, detection of objects crossing lines or areas of interest, vehicle license plate recognition, object tracking, facial recognition, automatically analyzing and tagging suspicious objects in a scene, activating alarms or taking other actions to alert security personnel, etc.

Figure 2:
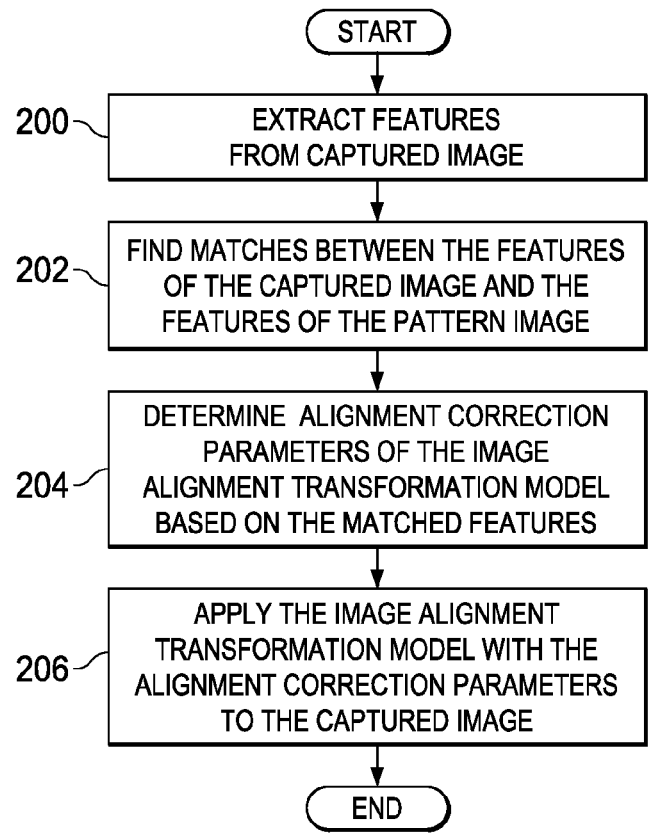
FIG. 2 is a flow diagram of a method.

FIG. 2 is a flow diagram of a method for projector-camera (imaging sensor) misalignment correction that may be performed, for example, by the digital structured light device 100 of FIG. 1. Initially, features are extracted 200 from a captured image of a scene. The captured image includes both the scene and a pattern projected into the scene. Any suitable feature detection algorithm may be used. Examples of suitable algorithms include SIFT (Scale Invariant Feature Transform) and Harris corner detection. The SIFT algorithm is described in D. G. Lowe, "Distinctive Image Features from Scale-Invariant Keypoints," International Journal of Computer Vision, Vol. 60, No. 2, pp. 91-110, November 2004 ("Lowe" herein). Harris corner detection is described in C. Harris and M. Stephens, "A Combined Corner and Edge Detector," Proceedings of Fourth Alvey Vision Conference, pp. 147-151, 1988. In another example, if the projected pattern is a simple stripe pattern as is the case with time-multiplexed patterns, a search based algorithm can be used to detect the corners of these stripes to extract the features.

Next, matches between the extracted features of the captured image and features of the pattern image are found 202. The pattern image is an image of the pattern that was projected into the scene when the captured image was captured. The pattern image and features for the pattern image are predetermined and are stored in the digital structured light system. The features for the pattern image are extracted using the same feature extraction algorithm used to extract features from the captured image. The predetermined pattern image and the associated features are stored in the digital structured light system. The pattern image may be any suitable two-dimensional (2D) high frequency binary pattern. Binary patterns with high-frequency details contain several distinct features/corners which can be detected by a suitable feature detection algorithm. Binary patterns are preferred over continuous patterns because continuous patterns do not have distinct features that can be used for feature matching. In some embodiments, the pattern image is a fixed, binary pattern image of pseudo-random dots.

Any suitable algorithm may be used to find matches between the features of the captured image and the features of the pattern image. Examples of suitable matching algorithms include the matching algorithm described in Lowe and the BRIEF (Binary Robust Independent Elementary Features) algorithm described in M. Calonder et al., "BRIEF: Binary Robust Independent Elementary Features," Proceedings of the 11$^{th}$ European Conference on Computer Vision Part IV, pp. 778-792, September 2010.

The matched features are then used to determine 204 alignment correction parameters of a 2D image alignment transformation model. In essence, the matching features are used to model the relationship between the captured image and the pattern image in terms of parameters of the 2D image alignment transformation model used. In some embodiments, an affine transformation model is used. The classic affine transformation model is given as follows:

$$\begin{bmatrix} x' \\ y' \end{bmatrix} = \begin{bmatrix} 1+c & -s \\ s & 1+c \end{bmatrix} \begin{bmatrix} x \\ y \end{bmatrix} + \begin{bmatrix} d_x \\ d_y \end{bmatrix}$$

where $d_x$ is the horizontal translation parameter, $d_y$ is the vertical translation parameter, s is the rotation parameter, and c is the scaling parameter. This transformation model is modified depending upon the separation baseline of the camera and the imaging system, i.e., the directional component along the baseline is ignored because the difference observed in the baseline direction includes disparity in addition to misalignment, whereas the non-baseline direction includes just the misalignment. If the separation baseline is horizontal, the horizontal component of the model is removed, resulting in the following model with three parameters:

$$[y'] = [s \quad 1+c] \begin{bmatrix} x \\ y \end{bmatrix} + [d_y].$$

If the separation baseline is vertical, the vertical component of the model is removed, resulting in the following model with three parameters:

$$[x'] = [1+c \quad -s] \begin{bmatrix} x \\ y \end{bmatrix} + [d_x].$$

In some embodiments, a perspective transformation model, also referred to as a perspective transformation model or homography, is used. This model uses the same parameters as the affine model along with two additional parameters. This transformation model can be written as $$\begin{bmatrix} X \\ Y \\ Z \end{bmatrix} = \begin{bmatrix} 1+c & -s & d_x \\ s & 1+c & d_y \\ g & h & 1 \end{bmatrix} \begin{bmatrix} x \\ y \\ 1 \end{bmatrix}$$

where g and h are parameters that enable perspective warp. Cartesian coordinates can be calculated as x'=X/Z and y'=Y/Z. Similar to the affine model, this transformation model is modified depending upon the separation baseline of the camera and the imaging system. If the separation baseline is horizontal, the horizontal component of the model is removed, resulting in the following model with five parameters:

$$\begin{bmatrix} Y \\ Z \end{bmatrix} = \begin{bmatrix} s & 1+c & d_y \\ g & h & 1 \end{bmatrix} \begin{bmatrix} x \\ y \\ 1 \end{bmatrix}.$$

If the separation baseline is vertical, the vertical component of the model is removed, resulting in the following model with five parameters:

$$\begin{bmatrix} X \\ Z \end{bmatrix} = \begin{bmatrix} 1+c & -s & d_x \\ g & h & 1 \end{bmatrix} \begin{bmatrix} x \\ y \\ 1 \end{bmatrix}.$$

The parameters of the transformation model are estimated using an iterative process as follows. Least squares estimates of the parameters values are computed using the data set of matched features. The transformation model with the estimated parameter values is then applied to the features of the captured image and the errors between the locations of the transformed features of the captured image and the locations of the matching features of the pattern image are evaluated. If all the errors are below an error threshold, the estimated parameters values are accepted as the final parameter values. If there are any errors above the threshold, matched features with high error are removed from the data set and the parameters are estimated again with the reduced set of features. The process is repeated until a set of parameter values is estimated in which of the errors are below the error threshold.

After the parameter values are determined 204, the transformation model is applied 206 to the captured image using the determined parameter values to better align the captured image with the pattern image. The captured image may then be used for depth map computation.

Figure 3:
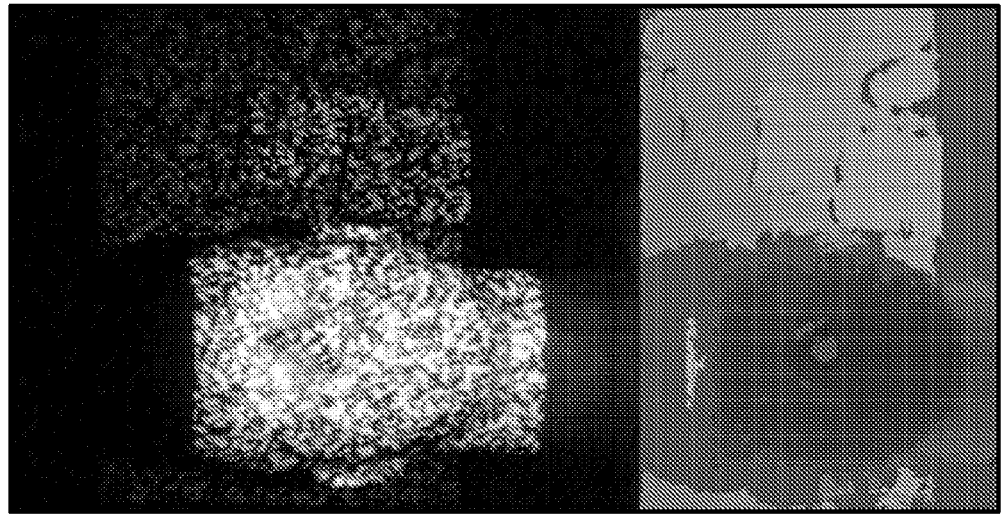
FIG. 3 is an example.
Figure 3:
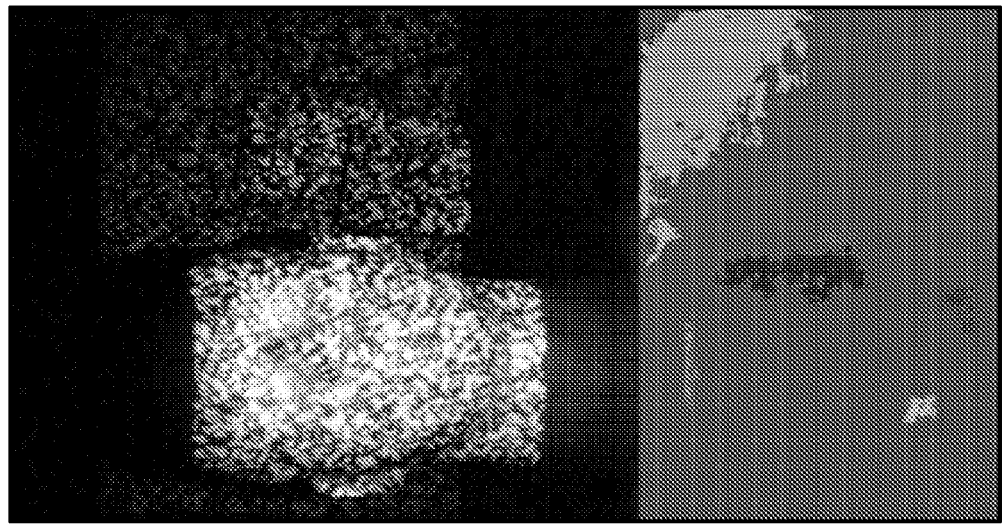

FIG. 3 is an example illustrating the efficacy of using the misalignment correction method. This example shows a captured image with no misalignment correction applied and the corresponding depth map and the same captured image after misalignment correction is applied and the corresponding depth map.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will understand embodiments in which the misalignment correction method is executed for each captured image.

In another example, one of ordinary skill in the art will understand embodiments in which the misalignment correction method is executed as needed to adjust the model parameters. The new model parameters may then be stored and used to correct misalignment in captured images until the need for another adjustment is determined.

In another example, one of ordinary skill in the art will understand embodiments in which the misalignment correction method is executed at regular time intervals during operation of the structured light device. At the end of each interval, the model parameters may be recomputed, stored, and used to correct misalignment in captured images during the next interval.

In another example, one of ordinary skill in the art will understand embodiments in which the misalignment correction method is executed responsive to a user command. The resulting model parameters may be stored and used to correct misalignment in captured images until the next time the method is executed.

In another example, one of ordinary skill in the art will understand embodiments in which the structured light device is configured to project multiple patterns. In such embodiments, a single suitable pattern may be used as the pattern image in the misalignment correction method and the resulting parameters used to correct misalignment in images captured using the other patterns. This single pattern may be projected at regular intervals to estimate alignment correction parameters or can be initiated by a user-activated control sequence when a need for adjustment is observed.

In another example, one of ordinary skill in the art will understand embodiments in which the predetermined features of the pattern image used for matching to features of the captured image are a subset of the total number of features extracted from the pattern image.

In another example, one of ordinary skill in the art will understand embodiments in which the projector component is a diffraction optical element (DOE) that constantly projects a single fixed pattern.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of misalignment correction in a structured light device, the method comprising:
   extracting features from a first captured image of a scene, wherein the first captured image is captured by an imaging sensor component of the structured light device, and wherein the first captured image comprises a pattern projected into the scene by a projector component of the structured light device;
   matching the features of the first captured image to predetermined features of a pattern image corresponding to the projected pattern to generate a dataset of matching features;
   determining values of alignment correction parameters of an image alignment transformation model using the dataset of matching features; and
   applying the image alignment transformation model to a second captured image using the determined alignment correction parameter values.

2. The method of claim 1, wherein the first captured image and the second captured image are a same captured image.

3. The method of claim 1, wherein the image alignment transformation model is an affine transformation model modified to remove a component corresponding to a separation baseline of the imaging sensor component and the projector component.

4. The method of claim 1, wherein the image alignment transformation model is a perspective transformation model modified to remove a component corresponding to a separation baseline of the imaging sensor component and the projector component.

5. The method of claim 1, wherein the predetermined features of the pattern image are a subset of a total number of features of the pattern image.

6. The method of claim 1, wherein the extracting, matching, and determining are performed at intervals during operation of the structured light device.

7. The method of claim 1, wherein the pattern is a two-dimensional high frequency binary pattern.

8. A structured light device comprising:
   an imaging sensor component configured to capture images of a scene;
   a projector component configured to project a pattern into the scene;
   a memory configured to store predetermined features of a pattern image corresponding to the pattern;
   means for extracting features from a first image of the scene captured by the imaging sensor component, wherein the first image comprises the pattern projected into the scene by the projector component;
   means for matching the features of the first image to the predetermined features to generate a dataset of matching features;
   means for determining values of alignment correction parameters of an image alignment transformation model using the dataset of matching features; and
   means for applying the image alignment transformation model with the determined alignment correction parameter values to a second image of the scene captured by the imaging sensor component.

9. The structured light device of claim 8, wherein the first image and the second image are a same image.

10. The structured light device of claim 8, wherein the image alignment transformation model is an affine transformation model modified to remove a component corresponding to a separation baseline of the imaging sensor component and the projector component.

11. The structured light device of claim 8, wherein the image alignment transformation model is a perspective transformation model modified to remove a component corresponding to a separation baseline of the imaging sensor component and the projector component.

12. The structured light device of claim 8, wherein the predetermined features of the pattern image are a subset of a total number of features of the pattern image.

13. The structured light device of claim 8, wherein the extracting, matching, and determining are performed at intervals during operation of the structured light device.

14. The structured light device of claim 8, wherein the pattern is a two-dimensional high frequency binary pattern.

15. A non-transitory computer-readable medium storing instructions that, when executed by at least one processor in a structured light device, cause a method of misalignment correction to be performed, the method comprising:
   extracting features from a first captured image of a scene, wherein the first captured image is captured by an imaging sensor component of the structured light device, and wherein the first captured image comprises a pattern projected into the scene by a projector component of the structured light device;
   matching the features of the first captured image to predetermined features of a pattern image corresponding to the projected pattern to generate a dataset of matching features;
   determining values of alignment correction parameters of an image alignment transformation model using the dataset of matching features; and
   applying the image alignment transformation model to a second captured image using the determined alignment correction parameter values.

16. The computer-readable medium of claim 15, wherein the first captured image and the second captured image are a same captured image.

17. The computer-readable medium of claim 15, wherein the image alignment transformation model is an affine transformation model modified to remove a component corresponding to a separation baseline of the imaging sensor component and the projector component.

18. The computer-readable medium of claim 15, wherein the image alignment transformation model is a perspective transformation model modified to remove a component corresponding to a separation baseline of the imaging sensor component and the projector component.

19. The computer-readable medium of claim 15, wherein the predetermined features of the pattern image are a subset of a total number of features of the pattern image.

20. The computer-readable medium of claim 15, wherein the extracting, matching, and determining are performed at intervals during operation of the structured light device.

* * * * *